US012062103B2

(12) United States Patent
Kommoju et al.

(10) Patent No.: US 12,062,103 B2
(45) Date of Patent: Aug. 13, 2024

(54) PREDICTING IDENTITY-OF-INTEREST DATA STRUCTURES BASED ON INCIDENT-IDENTIFICATION DATA

(71) Applicant: HONEYWELL INTERNATIONAL INC., Morris Plains, NJ (US)

(72) Inventors: Raja Sekhar Kommoju, Bangalore (IN); Raja Pratap Kondamari, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 915 days.

(21) Appl. No.: 16/661,884

(22) Filed: Oct. 23, 2019

(65) Prior Publication Data
US 2021/0125084 A1 Apr. 29, 2021

(51) Int. Cl.
*G06F 16/22* (2019.01)
*G06F 16/2458* (2019.01)
*G06F 16/9538* (2019.01)
*G06N 5/02* (2023.01)
*G06N 20/00* (2019.01)
*G06Q 50/26* (2024.01)

(52) U.S. Cl.
CPC ......... *G06Q 50/26* (2013.01); *G06F 16/2228* (2019.01); *G06F 16/2465* (2019.01); *G06N 5/02* (2013.01); *G06N 20/00* (2019.01)

(58) Field of Classification Search
CPC .............. G06F 16/254; G06F 16/2465; G06F 16/2228; G06Q 50/265; G06N 20/00; G06N 5/02
USPC ........................................................ 707/600
See application file for complete search history.

(56) References Cited

U.S. PATENT DOCUMENTS

| 6,463,441 | B1 | 10/2002 | Paradies |
| 7,805,457 | B1 * | 9/2010 | Viola ..................... G06Q 50/26 |
| | | | 707/E17.135 |
| 8,674,993 | B1 * | 3/2014 | Fleming ................ G06Q 40/06 |
| | | | 707/794 |
| 8,892,651 | B1 * | 11/2014 | Goldman ............ G06F 16/9024 |
| | | | 707/706 |
| 10,623,899 | B2 * | 4/2020 | Watkins ................ H04W 4/027 |
| 10,783,473 | B2 * | 9/2020 | Howie ................ G06F 16/2477 |
| 11,062,579 | B2 * | 7/2021 | Eswara ................ G06V 40/161 |
| 11,080,533 | B2 | 8/2021 | Camilus et al. |
| 11,093,848 | B2 * | 8/2021 | Chakraborty ............ G06N 5/01 |

(Continued)

FOREIGN PATENT DOCUMENTS

WO 2019/133052 A1 7/2019

OTHER PUBLICATIONS

China Unveils Minority Report-Style AI Security System, 2017, [online article] [retrieved Apr. 22, 2020] retrieved from the Internet URL: https://www.dailymail.co.uk/sciencetech/article-5170167/China-unveils-Minority-Report-style-AI-security-system.html, 6 pages.

(Continued)

*Primary Examiner* — Sherief Badawi
*Assistant Examiner* — Jessica N Le
(74) *Attorney, Agent, or Firm* — Alston & Bird LLP

(57) ABSTRACT

The present invention relates to a system for identifying identify of interest data structures based on a trained identity of interest model and using individual-incident data structures integrating individual identification data received from third party resources based on an incident data structure.

17 Claims, 7 Drawing Sheets

(56) References Cited

U.S. PATENT DOCUMENTS

| | | | |
|---|---|---|---|
| 2007/0011649 A1* | 1/2007 | Venolia | G06F 8/20 717/109 |
| 2007/0239724 A1* | 10/2007 | Ramer | G06F 16/951 |
| 2008/0109883 A1* | 5/2008 | Hernoud | G07C 9/257 726/19 |
| 2010/0162029 A1 | 6/2010 | Powell et al. | |
| 2012/0130937 A1* | 5/2012 | Leon, Jr. | G06Q 10/0635 707/769 |
| 2013/0039542 A1 | 2/2013 | Guzik | |
| 2013/0129307 A1 | 5/2013 | Choe et al. | |
| 2013/0132327 A1* | 5/2013 | Pande | G06N 5/022 706/50 |
| 2013/0205410 A1* | 8/2013 | Sambamurthy | G06F 21/84 726/28 |
| 2013/0285855 A1* | 10/2013 | Dupray | H04W 4/029 342/451 |
| 2013/0322686 A1 | 12/2013 | Kritt et al. | |
| 2014/0075004 A1* | 3/2014 | Van Dusen | G06N 20/00 709/223 |
| 2016/0179979 A1 | 6/2016 | Aasman et al. | |
| 2016/0283589 A1* | 9/2016 | Bostick | G06Q 50/01 |
| 2016/0343093 A1 | 11/2016 | Riland et al. | |
| 2017/0024531 A1 | 1/2017 | Malaviya | |
| 2017/0132739 A1 | 5/2017 | Meaney et al. | |
| 2017/0235848 A1 | 8/2017 | Van et al. | |
| 2018/0068173 A1* | 3/2018 | Kolleri | G06V 40/172 |
| 2018/0107935 A1* | 4/2018 | Jeon | G08G 1/202 |
| 2018/0218071 A1* | 8/2018 | Donndelinger | G06N 5/022 |
| 2018/0314880 A1* | 11/2018 | Fadeev | G06F 16/9535 |
| 2019/0043201 A1 | 2/2019 | Strong et al. | |
| 2019/0050732 A1* | 2/2019 | Anderson | G06N 3/04 |
| 2019/0182273 A1* | 6/2019 | Walsh | H04L 63/1425 |
| 2019/0235487 A1* | 8/2019 | Zhao | G08G 1/127 |
| 2019/0244301 A1 | 8/2019 | Seth et al. | |
| 2019/0304042 A1 | 10/2019 | Santell et al. | |
| 2019/0362263 A1* | 11/2019 | Harris | G06Q 30/0204 |
| 2020/0143459 A1* | 5/2020 | Simpson | G06Q 30/0641 |
| 2020/0177608 A1* | 6/2020 | Okunlola | H04L 63/1425 |
| 2020/0411191 A1* | 12/2020 | Balian | G06N 5/02 |
| 2021/0034671 A1* | 2/2021 | Lemay | H04N 7/186 |
| 2021/0117712 A1* | 4/2021 | Huang | G10L 15/32 |

OTHER PUBLICATIONS

Extended European Search Report issued in European Application No. 20203184.5 on Mar. 19, 2021, 7 pages.

Non-Final Rejection Mailed on Jan. 17, 2023 for U.S. Appl. No. 17/064,337.

Final Rejection Mailed on Jul. 21, 2023 for U.S. Appl. No. 17/064,337, 20 page(s).

Advisory Action (PTOL-303) Mailed on Sep. 21, 2023 for U.S. Appl. No. 17/064,337, 3 page(s).

Notice of Allowance and Fees Due (PTOL-85) Mailed on Dec. 20, 2023 for U.S. Appl. No. 17/064,337, 10 page(s).

* cited by examiner

PREDICTING IDENTITY-OF-INTEREST DATA STRUCTURES BASED ON INCIDENT-IDENTIFICATION DATA

BACKGROUND

When incident data becomes available, such as that related to a crime, conventional techniques for identifying persons of interest can require significant law enforcement manpower and time. Applicant has identified a number of deficiencies and problems associated with such conventional techniques. Through applied effort, ingenuity, and innovation, many of these identified problems have been solved by developing solutions that are included in some embodiments of the present disclosure, many examples of which are described in detail herein.

SUMMARY

Embodiments of the present disclosure are directed to identifying identity of interest data structures relating to an incident data structure. In embodiments, an apparatus for identifying identity of interest data structures relating to an incident data structure comprises at least one processor and at least one memory storing instructions that are used in conjunction with the at least one processor to cause the apparatus to perform operations as described herein.

In embodiments, the apparatus is configured to receive, from a client device, an identity of interest data request. In embodiments, the identity of interest data request comprises an incident data structure comprising incident data.

In embodiments, the apparatus is configured to transmit, to one or more third party resource providers, one or more individual identification data requests. In embodiments, the one or more third party resource providers are selected based at least in part on the incident data. In embodiments, the one or more individual identification data requests comprises at least a portion of the incident data.

In embodiments, the apparatus is configured to integrate into an incident-identification data structure individual identification data received from the one or more third party resource providers.

In embodiments, the apparatus is configured to programmatically identify, using a trained identity of interest model and based on the incident-identification data structure, one or more potential identity of interest data structures.

In embodiments, the apparatus is configured to render for display an interface comprising the one or more potential identity of interest data structures.

In embodiments, the apparatus is configured to generate one or more ontology data structures. In embodiments, each ontology data structure is generated for each potential identity of interest data structure based at least in part on the incident-identification data structure and the trained person of interest predictive model. In embodiments, the apparatus is configured to render for display an interface comprising the one or more ontology data structures.

In embodiments, the incident-identification data structure further comprises a feature vector, the feature vector comprising one or more attributes.

In embodiments, an attribute comprises one or more of video data, facial recognition data associated with the video data, or possible identity of interest data structures associated with the facial recognition data.

In embodiments, the incident data comprises an incident time and an incident location.

In embodiments, the trained identity of interest model comprises a machine learning algorithm trained using one or more of video data, location data, mobile device data, audio data, travel data, or financial data.

In embodiments, a third party resource provider comprises one or more of a video management server, a criminal database server, a mobile service carrier server, a social network server, a tracing server, a financial institution server, a government agency server, a transportation network server, a video parsing server, or a facial recognition server.

In embodiments, each of the identified one or more potential identity of interest data structures is associated with a confidence score.

In embodiments, the trained identity of interest model identifies a potential identity of interest data structure based on a programmatically generated likelihood that an identity attribute of the identity of interest data structure comprises an identity attribute is associated with incident data of the incident data structure.

Systems and computer program products corresponding to the above-summarized methods are also described and claimed herein.

Additional features and advantages are realized through the techniques of the present disclosure. Other embodiments and aspects of the disclosure are described in detail herein and are considered a part of the claimed disclosure. For a better understanding of the disclosure with advantages and features, refer to the description and to the drawings.

BRIEF DESCRIPTION OF THE FIGURES

Figure 1:
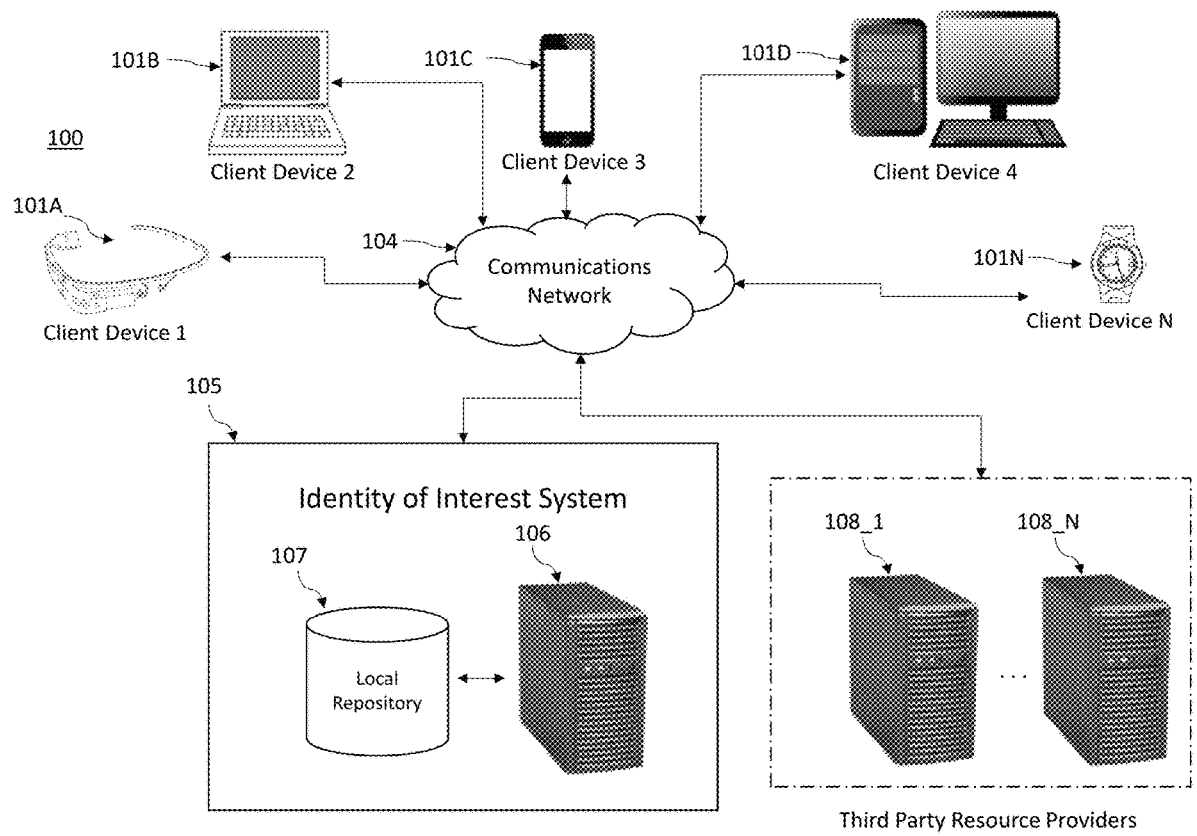
Figure 2:
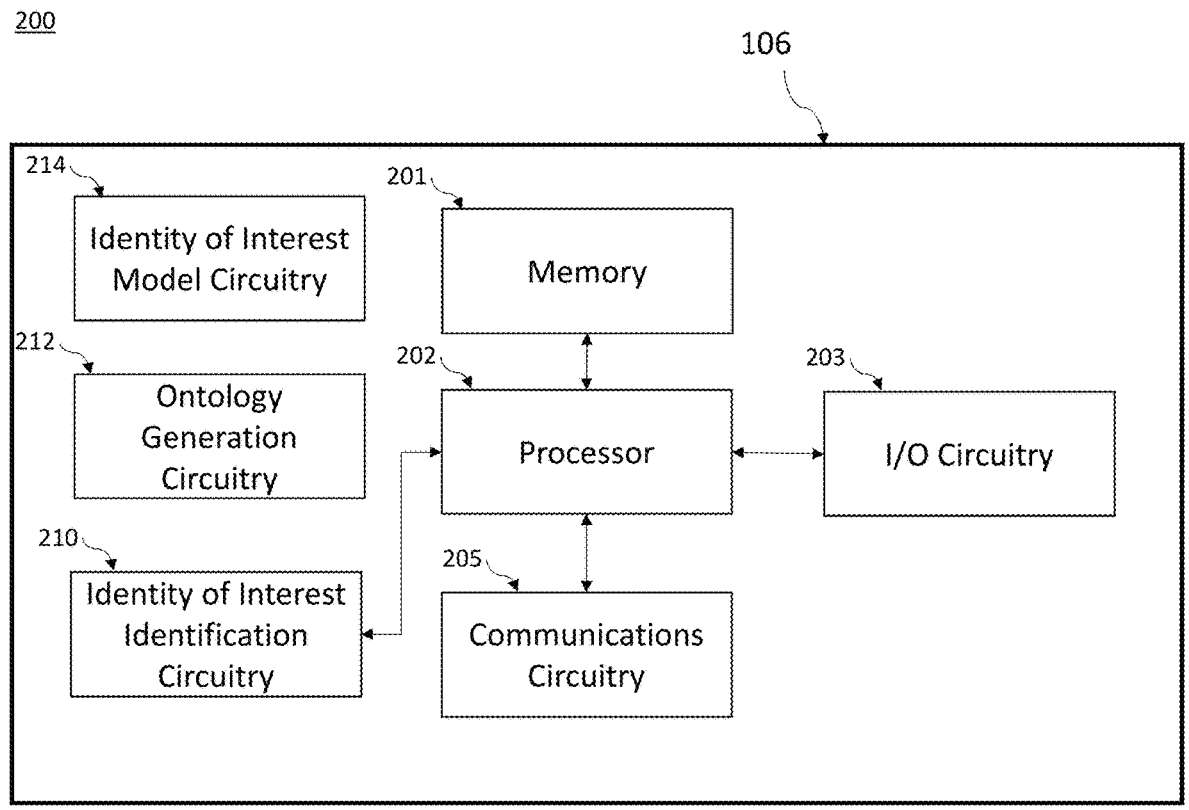
Figure 3A:
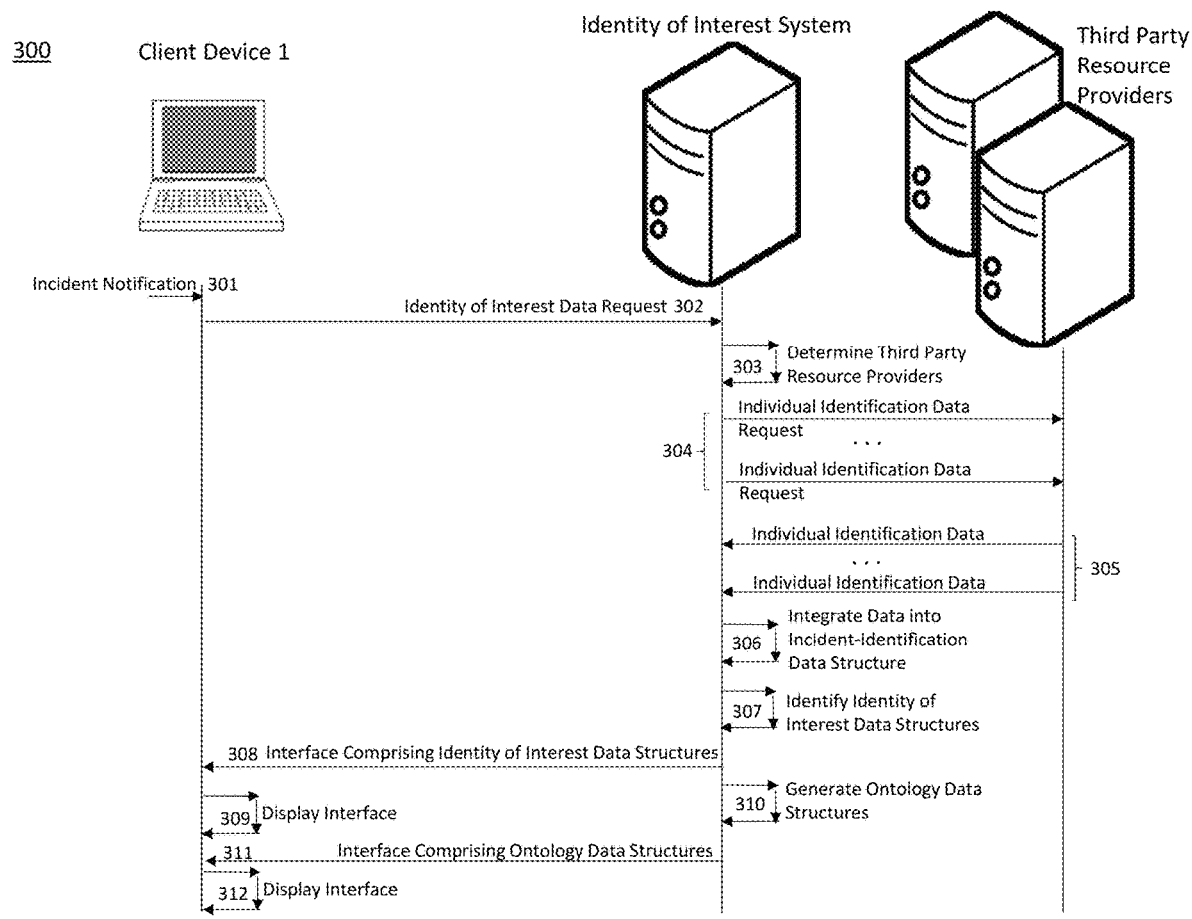
Figure 3B:
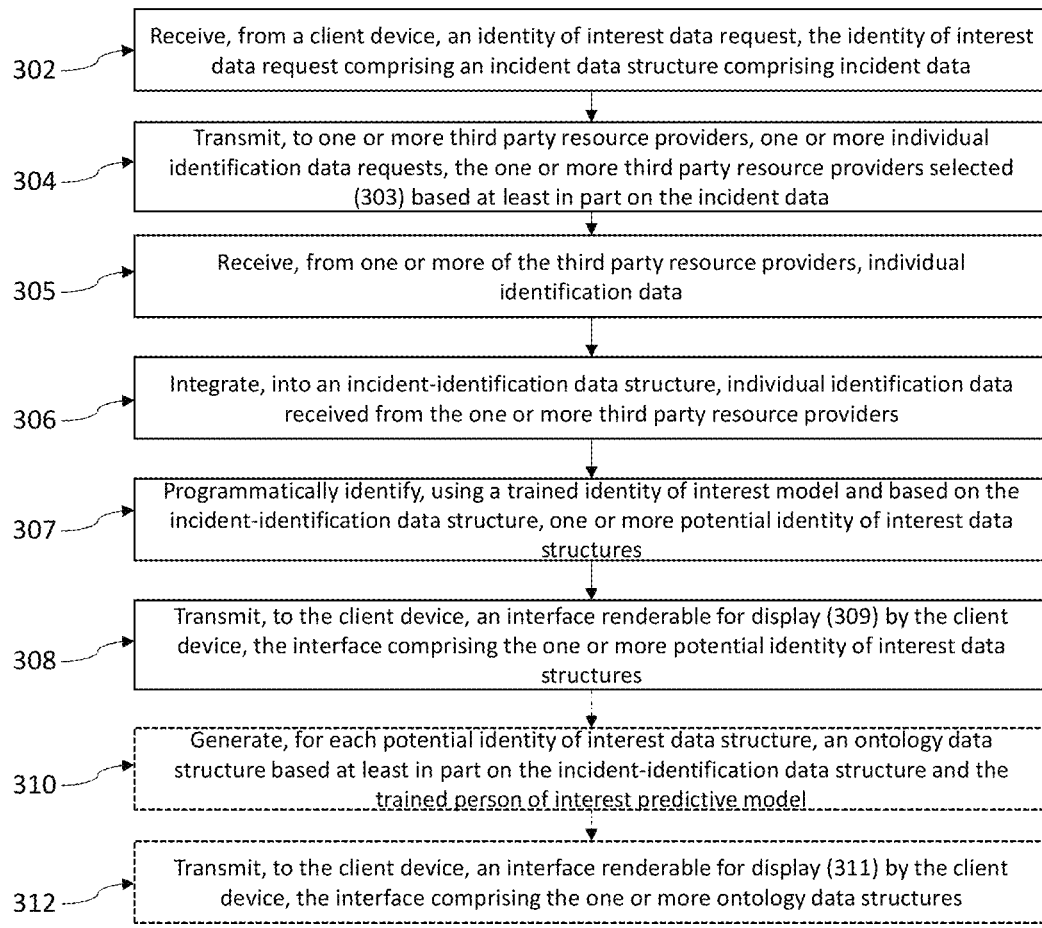
Figure 4:
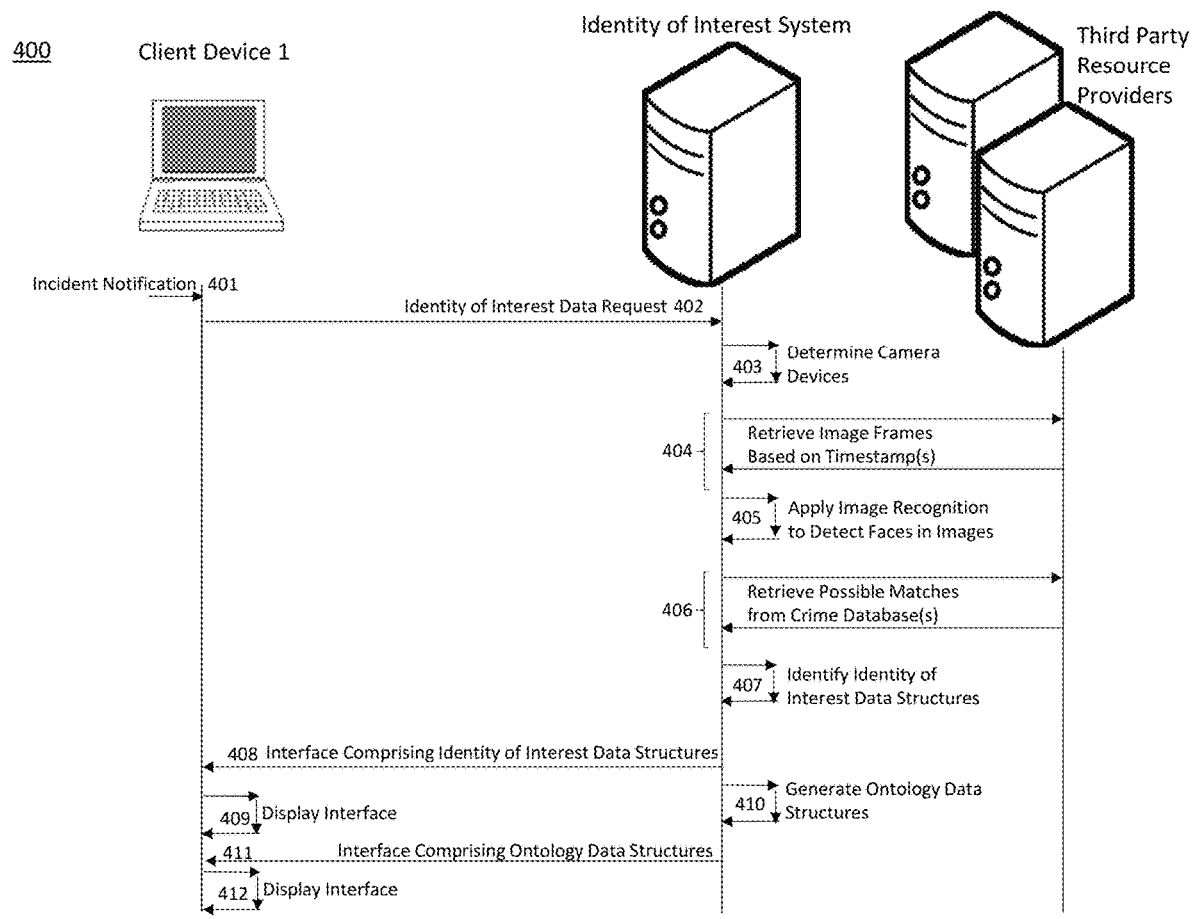
Figure 5:
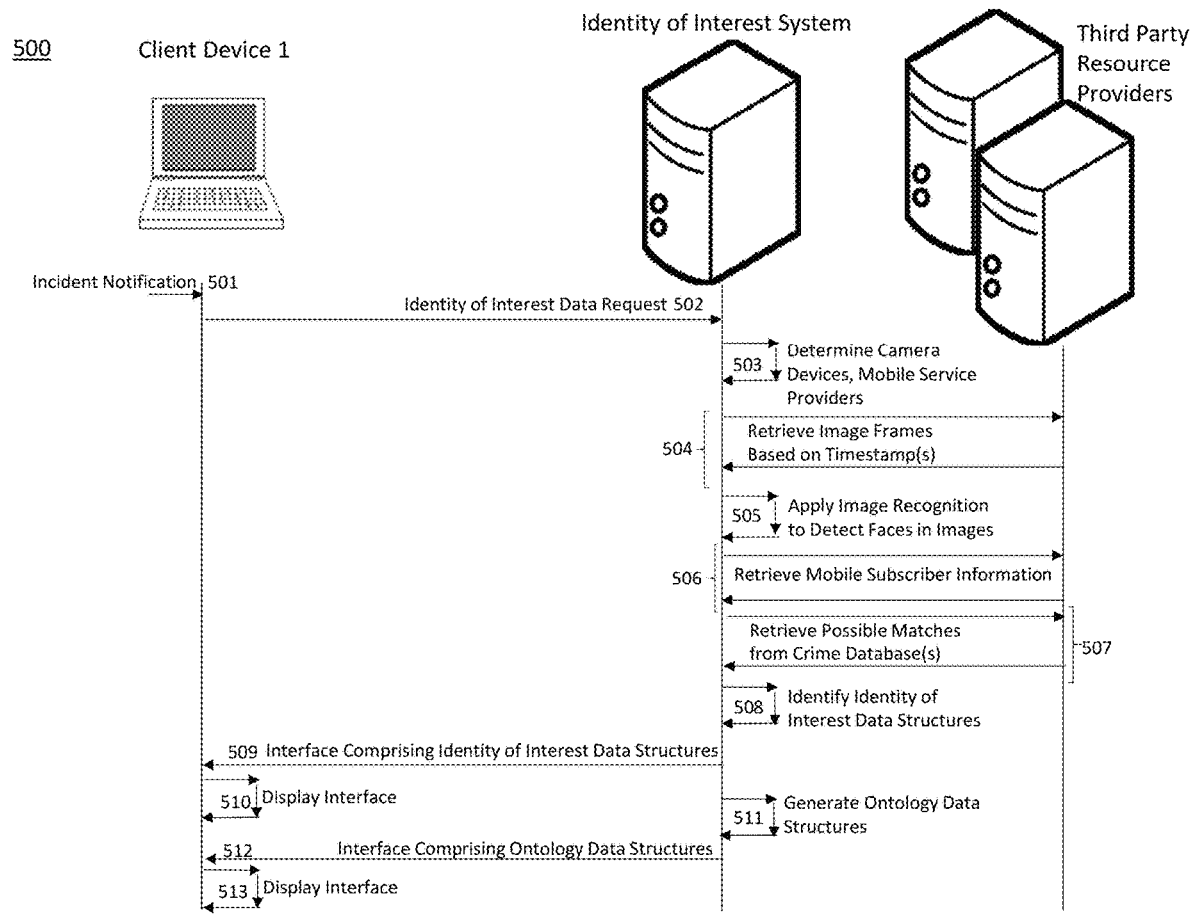
Figure 6:
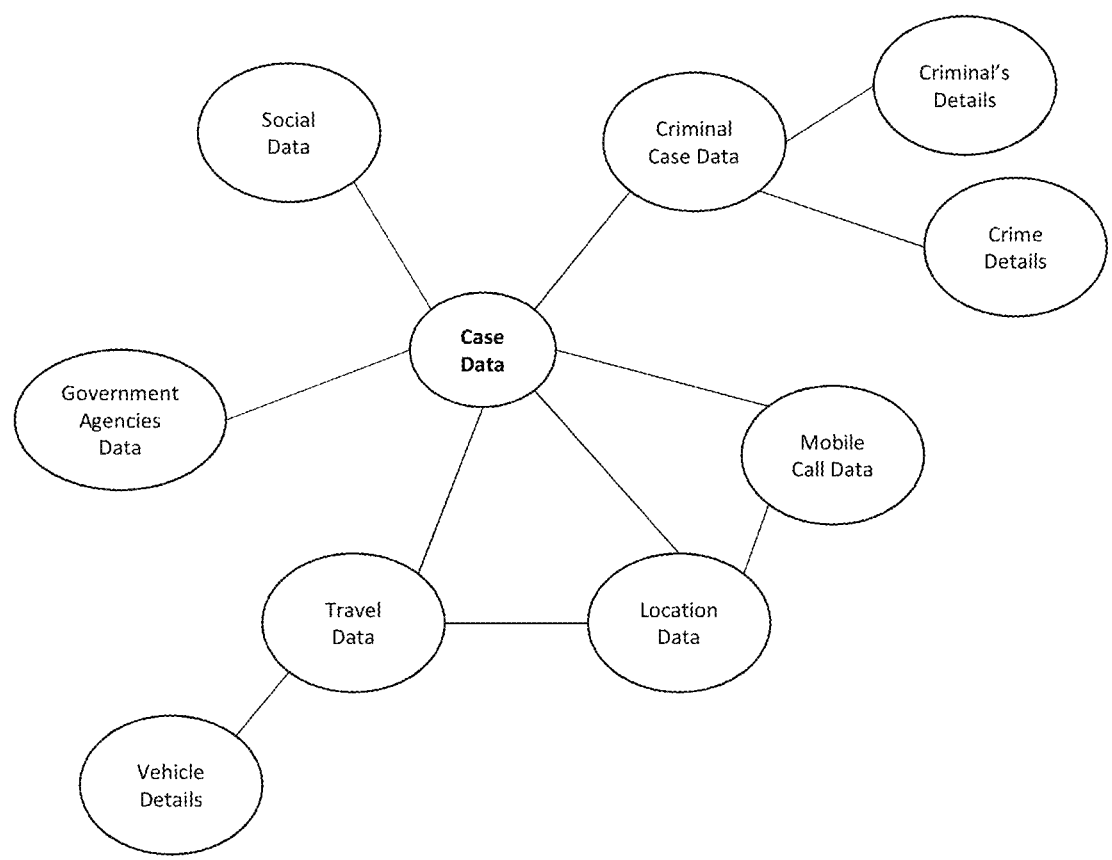

Having thus described the disclosure in general terms, reference will now be made to the accompanying drawings, which are not necessarily drawn to scale, and wherein:

FIG. 1 is a system architecture diagram of a system configured to practice embodiments of the present disclosure;

FIG. 2 is an exemplary schematic diagram of a computing entity according to embodiments of the present disclosure;

FIG. 3A illustrates exemplary operations performed by embodiments of the present disclosure;

FIG. 3B illustrates exemplary operations performed by embodiments of the present disclosure;

FIG. 4 illustrates exemplary operations performed by embodiments of the present disclosure;

FIG. 5 illustrates exemplary operations performed by embodiments of the present disclosure; and FIG. 6 illustrates an exemplary ontology for use with embodiments of the present disclosure.

The detailed description explains the preferred embodiments of the disclosure, together with advantages and features, by way of example with reference to the drawings.

DETAILED DESCRIPTION

The present disclosure is directed to a system for identifying identity of interest data structures associated with incident data in near real time. That is, upon receipt of data (e.g., time and location) related to an incident (e.g., a crime, a bank robbery, an assault, and the like), embodiments of the present disclosure provide a framework for immediate retrieval of relevant data from a plurality of disparate sources and subsequent processing of the retrieved data using image recognition, facial recognition, machine learning, and the like to provide identity of interest data structures comprising identity data having a high likelihood of being related to the incident (i.e., identifying persons of interest without undue delay upon receiving incident data).

Conventional techniques for providing surveillance and subsequent investigation of incidents rely upon significant manual efforts to determine appropriate data sources from which to retrieve data that is possibly associated with the incident. Because such data sources are disparate, retrieval of data sometimes requires travel or other clumsy data processing in order for the data to be available for visual processing.

The aforementioned conventional techniques lead to significant delays in incident investigations, especially when time is of the essence. While the aforementioned conventional techniques may eventually piece together various items of data over weeks or months of time, by the time the data are pieced together they have likely become obsolete or irrelevant. Such timing issues introduce inaccuracies as well as failure to arrive at an answer or solution.

The aforementioned conventional techniques further waste computing resources (e.g., memory, network bandwidth, processing capacity, processing time) due to the possibility of collecting, processing, and storing unrelated data (e.g., because it is not yet known that the data is irrelevant or obsolete) for an undetermined amount of time.

The present disclosure reduces time to resolution in incident investigations, increases accuracies in determining identity of interest data structures, and reduces the waste of computing resources by properly identifying the most relevant data to collect, process, and store.

Exemplary System Architecture

Methods, apparatuses, and computer program products of the present disclosure may be embodied by any of a variety of devices. For example, the method, apparatus, and computer program product of an example embodiment may be embodied by a networked device (e.g., an identity of interest platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

As used herein, the terms "data object", "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices/entities, such as, for example, one or more servers, relays, routers, network access points, base stations, hosts, and/or the like, sometimes referred to herein as a "network." Similarly, where a computing device is described herein to transmit data to another computing device, it will be appreciated that the data may be sent directly to another computing device or may be sent indirectly via one or more intermediary computing devices/entities, such as, for example, one or more servers, relays, routers, network access points, base stations, hosts, and/or the like.

FIG. 1 illustrates an example computing system 100 within which embodiments of the present disclosure may operate. Users may access an identity of interest system 105 via a communications network 104 using client devices 101A-101N.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the identity of interest system. In some embodiments, the protocol is a custom protocol of JSON objects sent via a Websocket channel. In some embodiments, the protocol is JSON over RPC, JSON over REST/HTTP, and the like.

An identity of interest server 106 may be embodied as a computer or computers. The identity of interest server 106 may provide for receiving of electronic data from various sources, including but not necessarily limited to the client devices 101A-101N. For example, the identity of interest server 106 may be operable to receive identity of interest data requests from and transmit interfaces comprising data structures for rendering by the client devices 101A-101N. In some embodiments, the identity of interest server 106 may be in communication with one or more third party resource providers 108_1-108_N for retrieval of identity information related to incident data requests.

An identity of interest repository 107 (or local repository) may be embodied as a data storage device such as a Network Attached Storage (NAS) device or devices, or as a separate repository server or servers. The identity of interest repository 107 includes information accessed and stored by the identity of interest server 106 to facilitate the operations of the identity of interest system 105.

The client devices 101A-101N may be any computing device as defined above. Electronic data received by the identity of interest server 106 from the client devices 101A-101N may be provided in various forms and via various methods. For example, the client devices 101A-101N may include desktop computers, laptop computers, smartphones, netbooks, tablet computers, wearables, and the like.

In some embodiments where a client device 101A-101N is a mobile device, such as a smart phone or tablet, the client device 101A-101N may execute an "app" to interact with the identity of interest system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via APIs provided by the mobile device operating system.

Additionally or alternatively, the client device 101A-101N may interact with the identity of interest system 105 via a web browser. As yet another example, the client device 101A-101N may include various hardware or firmware designed to interface with the identity of interest system 105.

Example Apparatus for Implementing Embodiments of the Present Disclosure

The identity of interest server 106 may be embodied by one or more computing systems, such as apparatus 200 shown in FIG. 2. The apparatus 200 may include a processor 202, a memory 201, input/output circuitry 203, communications circuitry 205, identity of interest identification circuitry 210, ontology generation circuitry 212, and identity of interest model circuitry 214. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the terms "circuitry" and "module" as used herein with respect to components of the apparatus should therefore be understood to include particular hardware configured to perform the functions associated with the particular circuitry as described herein.

The terms "circuitry" and "module" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The identity of interest circuitry 210 includes hardware configured to support identification of identity of interest data structures in an identity of interest system. The identity of interest circuitry 210 may utilize processing circuitry, such as the processor 202, to perform actions including receiving identity of interest data requests from client devices 101A-101N or transmitting interfaces to client devices 101A-101N for rendering by the client devices. The identity of interest circuitry 210 may store and/or access identity of interest data from identity of interest repository 107. It should also be appreciated that, in some embodiments, the identity of interest circuitry 210 may include a separate processor, specially configured field programmable gate array (FPGA), or application-specific integrated circuit (ASIC).

The identity of interest model circuitry 214 includes hardware, software, or a combination thereof, configured to support generation, training, and use of a machine learning model for the programmatic identification of identity of interest data structures. It should be appreciated that, in some embodiments, identity of interest model circuitry 214 may utilize one or more of the other modules described with respect to apparatus 200 to perform some or all of the actions described above. For example, in some embodiments, the identity of interest model circuitry 214 utilizes processing circuitry, such as the processor 202, to perform at least one of the actions described above. It should also be appreciated that, in some embodiments, the identity of interest model circuitry 214 may include a separate processor, specially configured field programmable gate array (FPGA), or specially configured application-specific integrated circuit (ASIC).

The ontology generation circuitry 212 includes hardware, software, or a combination thereof, configured to support generation of ontology data structures based on identity of interest data structures, incident data, a trained identity of interest model, and/or incident-identification data structures. It should be appreciated that, in some embodiments, ontology generation circuitry 212 may utilize one or more of the other modules described with respect to apparatus 200 to perform some or all of the actions described above. For example, in some embodiments, the ontology generation circuitry 212 utilizes processing circuitry, such as the processor 202, to perform at least one of the actions described above. It should also be appreciated that, in some embodiments, the ontology generation circuitry 212 may include a separate processor, specially configured field programmable gate array (FPGA), or specially configured application-specific integrated circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Operations Performed by Embodiments of the Present Disclosure

FIGS. 3A-3B illustrate exemplary operations 300 for identifying identity of interest data structures, for use with embodiments of the present disclosure.

In embodiments, an identity of interest system, as described herein, receives 302, from a client device, an identity of interest data request. In embodiments, the identity of interest data request comprises an incident data structure comprising incident data. In embodiments, the client device transmits the identity of interest data request in response to receiving 301 an incident notification.

In embodiments, the identity of interest system transmits 304 to the determined one or more third party resource providers, one or more individual identification data requests. In embodiments, the one or more third party resource providers are selected 303 based at least in part on the incident data. In embodiments, the one or more individual identification data requests comprise at least a portion of the incident data.

In embodiments, the identity of interest system integrates 306, into an incident-identification data structure, individual identification data received 305 from the one or more third party resource providers.

In embodiments, the identity of interest system programmatically identifies 307, using a trained identity of interest model and based on the incident-identification data structure, one or more potential identity of interest data structures. In embodiments, the trained identity of interest model comprises a machine learning algorithm trained using one or more of video data, location data, mobile device data, audio data, travel data, identification data, or financial data.

In embodiments, the identity of interest system transmits 308 to the client device an interface that is renderable for display 309 by a client device. In embodiments, the interface comprises the one or more potential identity of interest data structures.

In embodiments, the identity of interest system generates 310 an ontology data structure for each potential identity of interest data structure based at least in part on the incident-identification data structure and the trained person of interest predictive model.

In embodiments, the identity of interest system transmits 311 to the client device an interface that is renderable for display 312 by a client device. In embodiments, the interface comprises the one or more ontology data structures. In embodiments, ontology data structures are generated in accordance with the example depicted in FIG. 6.

In embodiments, the incident-identification data structure further comprises a feature vector, the feature vector comprising one or more attributes. In embodiments, an attribute comprises one or more of video data, facial recognition data associated with the video data, or possible identity of interest data structures associated with the facial recognition data.

In embodiments, the incident data comprises an incident time and an incident location.

In embodiments, a third party resource provider comprises one or more of a video management server, a criminal database server, a mobile service carrier server, a social network server, a tracing server, a financial institution server, a government agency server, a transportation network server, a video parsing server, or a facial recognition server.

In embodiments, each of the identified one or more potential identity of interest data structures is associated with a confidence score.

In embodiments, the trained identity of interest model identifies a potential identity of interest data structure based on a programmatically generated likelihood that an identity attribute of the identity of interest data structure comprises an identity attribute is associated with incident data of the incident data structure.

FIG. 4 illustrates exemplary operations 400 for implementing embodiments of the present disclosure. In an example depicted in FIG. 4, facial recognition may be used to retrieve potential identity of interest data structure information from a crime database.

In embodiments, an identity of interest system, as described herein, receives 402, from a client device, an identity of interest data request. In embodiments, the identity of interest data request comprises an incident data structure comprising incident data. In embodiments, the client device transmits the identity of interest data request in response to receiving 401 an incident notification.

In embodiments, the identity of interest system transmits 404 to one or more third party resource providers (e.g., in this scenario, camera systems), one or more individual identification data requests. In embodiments, the one or more third party resource providers (e.g., in this scenario, camera systems) are selected 403 based at least in part on the incident data. In embodiments, the one or more individual identification data requests comprise at least a portion of the incident data.

In embodiments, the identity of interest system retrieves 404 image frames from the one or more camera systems and applies 405 image recognition to the image frames to detect faces in the images.

In embodiments, the identity of interest system retrieves 406 identity information from one or more crime databases. In embodiments, the identity information is retrieved based on the faces detected in the images. In embodiments, the identity information is used to integrate into one or more incident-identification data structures.

In embodiments, the identity of interest system programmatically identifies 407, using a trained identity of interest model and based on the incident-identification data structures, one or more potential identity of interest data structures. In embodiments, the trained identity of interest model comprises a machine learning algorithm trained using one or more of video data, location data, mobile device data, audio data, travel data, identification data, or financial data.

In embodiments, the identity of interest system transmits 408 to the client device an interface that is renderable for display 409 by a client device. In embodiments, the interface comprises the one or more potential identity of interest data structures.

In embodiments, the identity of interest system generates 410 an ontology data structure for each potential identity of interest data structure based at least in part on the incident-identification data structures and the trained person of interest predictive model.

In embodiments, the identity of interest system transmits 411 to the client device an interface that is renderable for display 412 by a client device. In embodiments, the interface comprises the one or more ontology data structures.

FIG. 5 illustrates exemplary operations 500 for implementing embodiments of the present disclosure. In an example depicted in FIG. 5, facial recognition and mobile device subscriber data may be used to retrieve potential identity of interest data structure information from a crime database and a voter registration database.

In embodiments, an identity of interest system, as described herein, receives 502, from a client device, an identity of interest data request. In embodiments, the identity of interest data request comprises an incident data structure comprising incident data. In embodiments, the client device transmits the identity of interest data request in response to receiving 501 an incident notification.

In embodiments, the identity of interest system transmits 504 to one or more third party resource providers (e.g., in this scenario, camera systems and mobile service providers), one or more individual identification data requests. In embodiments, the one or more third party resource providers (e.g., in this scenario, camera systems and mobile service providers) are selected 503 based at least in part on the incident data. In embodiments, the one or more individual identification data requests comprise at least a portion of the incident data.

In embodiments, the identity of interest system retrieves 504 image frames from the one or more camera systems and applies 505 image recognition to the image frames to detect faces in the images.

In embodiments, the identity of interest system retrieves 506 mobile subscriber information from one or more mobile subscribers. In embodiments, the mobile subscriber information comprises a list of mobile subscribers known to have been in a vicinity of a location associated with the incident data within a particular time window of a timestamp associated with the incident data. In embodiments, the mobile subscriber information further comprises photo identification for each mobile subscriber of the list of mobile subscribers.

In embodiments, the identity of interest system retrieves 507 identity information from one or more crime databases. In embodiments, the identity information is retrieved based on the faces detected in the images as well as the mobile subscriber information. In embodiments, the identity information and mobile subscriber information are used to integrate into one or more incident-identification data structures.

In embodiments, the identity of interest system programmatically identifies 508, using a trained identity of interest model and based on the incident-identification data structures, one or more potential identity of interest data structures. In embodiments, the trained identity of interest model comprises a machine learning algorithm trained using one or more of video data, location data, mobile device data, audio data, travel data, identification data, or financial data.

In embodiments, the identity of interest system transmits 509 to the client device an interface that is renderable for display 510 by a client device. In embodiments, the interface comprises the one or more potential identity of interest data structures.

In embodiments, the identity of interest system generates 511 an ontology data structure for each potential identity of interest data structure based at least in part on the incident-identification data structures and the trained person of interest predictive model.

In embodiments, the identity of interest system transmits 512 to the client device an interface that is renderable for display 513 by a client device. In embodiments, the interface comprises the one or more ontology data structures.

FIG. 6 illustrates an exemplary ontology for use with embodiments of the present disclosure. In embodiments, one or more ontology data structures are generated based upon a generated ontology which may be represented as a graph comprising a plurality of nodes and a plurality of edges. In embodiments, each node of the plurality of nodes comprises incident-identification data (e.g., social data, government agency data, travel data, vehicle details, location data, mobile call data, case data, criminal case data, crime details, criminal/personal details, etc.) from an incident-identification data structure, and where each edge of the plurality of edges represents a relationship (and/or strength of a relationship) between two nodes. In embodiments, the ontology and ontology data structure are generated using the trained person of interest predictive model and is based on a specific potential identity of interest data structure.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory storing instructions that, with the at least one processor, cause the apparatus to:
    receive a first request comprising incident data indicative of at least one of: a timestamp and a location of occurrence of an incident, wherein the first request is based on the occurrence of the incident;
    transmit the first request to a first plurality of third party resource providers, the first plurality of third party resource providers correspond to one or more camera systems, wherein the first plurality of third party resource providers are selected from amongst a plurality of third party resource providers based at least in part on the incident data;
    process one or more image frames from the plurality of camera systems to determine facial recognition data associated with one or more persons;
    transmit a second request to a second plurality of third party resource providers, wherein the second plurality of third party resource providers correspond to one or more mobile service providers, wherein the second plurality of third party resource providers are selected based at least in part on the facial recognition data;
    retrieve mobile subscriber information from the one or more mobile service providers, wherein the mobile subscriber information comprises a list of mobile subscribers in a vicinity of the location associated with the incident within a particular time window of the timestamp associated with the incident, wherein the mobile subscriber information further comprises a photo identification for each mobile subscriber of the list of mobile subscribers;
    process the facial recognition data and the mobile subscriber information to identify individual identification data;
    generate integrated data based on the individual identification data and incident identification data, wherein the incident identification data comprises at least one of: social data, government agency data, travel data, vehicle details, mobile call data, and criminal case data;
    identify, using a trained machine learning model and the integrated data, one or more potential identities;
    generate an ontology structure for each of the one or more potential identities based on the incident identification data, wherein the ontology structure comprises a graphical structure with a plurality of nodes connected by a plurality of edges, wherein each node of the plurality of nodes comprises the incident identification data, and wherein each edge of the plurality of edges represents a strength of a relationship between two nodes of the plurality of nodes; and
    render for display an interface comprising the ontology structure for each of the one or more potential identities.

2. The apparatus of claim 1, wherein the trained machine learning model comprises a machine learning algorithm trained using one or more of: video data, location data, mobile device data, audio data, the travel data, or financial data.

3. The apparatus of claim 1, wherein the first plurality of third party resource providers comprises a video management server, a facial recognition server, and a video parsing server, and wherein the second plurality of third party resource providers comprises: a criminal database server, a mobile service carrier server, a social network server, a tracing server, a financial institution server, a government agency server, and a transportation network server.

4. The apparatus of claim 1, wherein each of the one or more potential identities is associated with a confidence score.

5. The apparatus of claim 1, wherein the trained machine learning model identifies the one or more potential identities based on a likelihood that the one or more persons is associated with the incident data, and wherein the incident is at least one of: a crime, a bank robbery, and an assault.

6. The apparatus of claim 1, wherein the facial recognition data is determined based at least in part on an application of image recognition to the one or more image frames to detect one or more faces of the one or more persons.

7. A computer-implemented method comprising:
    receiving a first request comprising incident data indicative of at least one of: a timestamp and a location of occurrence of an incident, wherein the first request is based on the occurrence of the incident;
    transmitting the first request to a first plurality of third party resource providers, the first plurality of third party resource providers correspond to one or more camera systems, wherein the first plurality of third party resource providers are selected from amongst a plurality of third party resource providers based at least in part on the incident data;

processing one or more image frames from the plurality of camera systems to determine facial recognition data associated with one or more persons;

transmitting a second request to a second plurality of third party resource providers, wherein the second plurality of third party resource providers correspond to one or more mobile service providers, wherein the second plurality of third party resource providers are selected based at least in part on the facial recognition data;

retrieving mobile subscriber information from the one or more mobile service providers, wherein the mobile subscriber information comprises a list of mobile subscribers in a vicinity of the location associated with the incident within a particular time window of the timestamp associated with the incident, wherein the mobile subscriber information further comprises a photo identification for each mobile subscriber of the list of mobile subscribers;

processing the facial recognition data and the mobile subscriber information to identify individual identification data;

generating integrated data based on the individual identification data and incident identification data, wherein the incident identification data comprises at least one of: social data, government agency data, travel data, vehicle details, mobile call data, and criminal case data;

identifying, using a trained machine learning model and the integrated data, one or more potential identities;

generating an ontology structure for each of the one or more potential identities based on the incident identification data, wherein generating the ontology structure comprises generating a graphical structure with a plurality of nodes connected by a plurality of edges, wherein each node of the plurality of nodes comprises the incident identification data, and wherein each edge of the plurality of edges represents a strength of a relationship between two nodes of the plurality of nodes; and render for display an interface comprising the ontology structure for each of the one or more potential identities.

8. The method of claim 7, further comprising:
training a machine learning algorithm of the trained machine learning model using one or more of: video data, location data, mobile device data, audio data, the travel data, or financial data; and
determining the facial recognition data based at least in part on an application of image recognition to the one or more image frames to detect one or more faces of the one or more persons.

9. The method of claim 7, wherein transmitting the first request to the first plurality of third party resource providers comprises transmitting the first request to: a video management server, a facial recognition server, and a video parsing server, and wherein transmitting the second request to the second plurality of third party resource providers comprises transmitting the second request to: a criminal database server, a mobile service carrier server, a social network server, a tracing server, a financial institution server, a government agency server, and a transportation network server.

10. The method of claim 7, further comprises associating each of the one or more potential identities with a confidence score.

11. The method of claim 7, wherein identifying the one or more potential identities is based on a likelihood that the one or more persons is associated with the incident data, and wherein the incident is at least one of: a crime, a bank robbery, and an assault.

12. A computer program product comprising a non-transitory computer readable storage medium storing computer code that, when executed by a computer, causes the computer to:

receive a first request comprising incident data indicative of at least one of: a timestamp and a location of occurrence of an incident, wherein the first request is based on the occurrence of the incident;

transmit the first request to a first plurality of third party resource providers, the first plurality of third party resource providers correspond to one or more camera systems, wherein the first plurality of third party resource providers are selected from amongst a plurality of third party resource providers based at least in part on the incident data;

process one or more image frames from the plurality of camera systems to determine facial recognition data associated with one or more persons;

transmit a second request to a second plurality of third party resource providers, wherein the second plurality of third party resource providers correspond to one or more mobile service providers, wherein the second plurality of third party resource providers are selected based at least in part on the facial recognition data;

retrieve mobile subscriber information from the one or more mobile service providers, wherein the mobile subscriber information comprises a list of mobile subscribers in a vicinity of the location associated with the incident within a particular time window of the timestamp associated with the incident, wherein the mobile subscriber information further comprises a photo identification for each mobile subscriber of the list of mobile subscribers;

process the facial recognition data and the mobile subscriber information to identify individual identification data;

generate integrated data based on the individual identification data and incident identification data, wherein the incident identification data comprises at least one of: social data, government agency data, travel data, vehicle details, mobile call data, and criminal case data;

identify, using a trained machine learning model and the integrated data, one or more potential identities;

generate an ontology structure for each of the one or more potential identities based on the incident identification data, wherein the ontology structure comprises a graphical structure with a plurality of nodes connected by a plurality of edges, wherein each node of the plurality of nodes comprises the incident identification data, and wherein each edge of the plurality of edges represents a strength of a relationship between two nodes of the plurality of nodes; and render for display an interface comprising the ontology structure for each of the one or more potential identities.

13. The computer program product of claim 12, wherein the trained machine learning model comprises a machine learning algorithm trained using one or more of: video data, location data, mobile device data, audio data, the travel data, or financial data.

14. The computer program product of claim 12, wherein the first plurality of third party resource providers comprises a video management server, a facial recognition server, and a video parsing server, and wherein the second plurality of third party resource providers comprises: a criminal database server, a mobile service carrier server, a social network server, a tracing server, a financial institution server, a government agency server, and a transportation network server.

15. The computer program product of claim 12, wherein each of the one or more potential identities is associated with a confidence score.

16. The computer program product of claim 12, wherein the trained machine learning model identifies the one or more potential identities based on a likelihood that the one or more persons is associated with the incident data, and wherein the incident is at least one of: a crime, a bank robbery, and an assault.

17. The computer program product of claim 12, wherein the facial recognition data is determined based at least in part on an application of image recognition to the one or more image frames to detect one or more faces of the one or more persons.

* * * * *